(12) United States Patent
Dutton et al.

(10) Patent No.: US 9,313,434 B2
(45) Date of Patent: Apr. 12, 2016

(54) PIXEL CIRCUIT WITH CAPACITOR DISCHARGE INDICATIVE OF NUMBER OF EVENTS

(71) Applicants: STMicroelectronics (Research & Development) Limited, Marlow, Buckinghamshire (GB); The University Court of the University of Edinburgh, Edinburgh (GB)

(72) Inventors: Neale Dutton, Edinburgh (GB); Robert Kerr Henderson, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 215 days.

(21) Appl. No.: 14/066,853

(22) Filed: Oct. 30, 2013

(65) Prior Publication Data

US 2014/0124653 A1 May 8, 2014

(51) Int. Cl.
H01L 31/107 (2006.01)
H04N 5/3745 (2011.01)
G01S 17/89 (2006.01)
G01S 7/486 (2006.01)

(52) U.S. Cl.
CPC ............ *H04N 5/3745* (2013.01); *G01S 7/4863* (2013.01); *G01S 17/89* (2013.01)

(58) Field of Classification Search
CPC ....... H04N 5/374; H04N 5/355; H04N 5/378; H01L 27/14609
USPC ...... 250/208.1, 214.1, 214 R, 214 VT, 214 L, 250/214 AG; 348/294, 297, 303
See application file for complete search history.

(56) References Cited

U.S. PATENT DOCUMENTS

2003/0042406 A1  3/2003  Charbon

2014/0175294 A1 * 6/2014 Frach .............. H04N 5/369
                                                           250/363.03

FOREIGN PATENT DOCUMENTS

| EP | 1132724 A2 | 9/2001 |
|---|---|---|
| GB | 2269010 A | 1/1994 |
| GB | 2485995 A | 6/2012 |
| GB | 2487958 A | 8/2012 |
| WO | WO-2008011617 A2 | 1/2008 |
| WO | WO-2011128131 A1 | 10/2011 |

OTHER PUBLICATIONS

UK-IPO Search Report for GB1219781.0 dated Feb. 25, 2013 (4 pages).
Krichel, N.: "Cumulative Data Acquisition in Comparative Photon-Counting Three-Dimensional Imaging," Journal of Modern Optics, ISSN 0950-0340, published 2011, vol. 58, issue 3-4, pp. 244-256.
Chitnis, Danial, et al: "A Flexible Compact Readout Circuit for SPAD Arrays," Department of Engineering Science, University of Oxford, Proc. of SPIE vol. 7780, 2010 SPIE (9 pages).

* cited by examiner

*Primary Examiner* — Kevin Pyo
(74) *Attorney, Agent, or Firm* — Gardere Wynne Sewell LLP (57) ABSTRACT

A pixel circuit includes a single photon avalanche diode (SPAD) and a measurement circuit including a capacitance. The circuit is operable to discharge a known portion of the charge on the capacitance upon each detection of a SPAD event within a time period, such that the charge remaining on the capacitance at the end of the time period corresponds to the number of SPAD events detected within the time period. A time resolved imaging apparatus includes an array of such pixel circuits. A method of counting photon detection includes sensing photons with a SPAD device and discharging a known portion of the charge on a capacitance upon each detection of a SPAD event within a time period.

24 Claims, 5 Drawing Sheets

PIXEL CIRCUIT WITH CAPACITOR DISCHARGE INDICATIVE OF NUMBER OF EVENTS

PRIORITY CLAIM

This application claims priority from Great Britain Application for Patent No. 1219781.0 filed Nov. 2, 2012, the disclosure of which is incorporated by reference.

TECHNICAL FIELD

This invention relates to pixel circuits comprising a Single Photon Avalanche Diode (SPAD) and in particular to Single Photon Avalanche Diode based time of flight pixels for time resolved imaging.

BACKGROUND

A SPAD is based on a p-n junction device biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

SPAD arrays have been used as solid-state detectors in imaging applications where high sensitivity and timing resolution are required. Current state of the art SPAD imaging arrays typically have large (>20 µm) pixel pitches. A smaller pixel pitch facilitates increased resolution for SPAD based 3D Imagers.

It is desirable to provide for smaller SPAD time of flight pixel circuits so as to be able to reduce pixel pitches in SPAD imaging arrays.

SUMMARY

In a first aspect there is provided a pixel circuit comprising: a single photon avalanche diode (SPAD); a measurement circuit comprising a capacitance, wherein said circuit is operable to discharge a known portion of the charge on said capacitance upon each detection of a SPAD event within a time period, such that the charge remaining on said capacitance at the end of the time period corresponds with the number of SPAD events detected within the time period.

Said pixel circuit may be operable to: count the number of SPAD events received in two or more statistical bins, calculate a phase change in said incident radiation compared to radiation emitted, and calculate from said phase change, the time of flight of radiation incident on said SPAD.

Said pixel circuit may comprise a switch controlled by the SPAD output and operable to discharge a known portion of the charge on said capacitance, on each detection of a SPAD event within said time period.

Said pixel circuit may comprise a time gating stage operable to begin sensing operation on reception of an enable signal. Said time gate stage may comprise a switch operable to selectively connect the SPAD output to the measurement circuit on reception of said enable signal. Said time gate stage may comprise two further switches operable to disable the pixel circuit on reception of a disable signal.

In a further aspect there is provided a time resolved imaging apparatus comprising an array of pixels according to the first aspect of the invention and an illumination source for providing said radiation incident on said SPAD. Said time resolved imaging apparatus may be operable to begin sensing operation of said array of pixels simultaneously with activation of said illumination source.

In a further aspect there is provided a method of measuring the time of flight of a photon comprising: activating a radiation source to emit photons; receiving some of said photons using a single photon avalanche diode (SPAD); and discharging a known portion of the charge on a capacitance upon each detection of a photon within a time period, such that the charge remaining on said capacitance at the end of the time period corresponds to the number of photons detected within the time period.

BRIEF DESCRIPTION OF THE DRAWINGS

Embodiments will now be described, by way of example only, by reference to the accompanying drawings, in which.

DETAILED DESCRIPTION OF THE DRAWINGS

Disclosed herein are Time of Flight (ToF) analog pixels, which may be used in a large scale array for 3D single photon avalanche diode (SPAD) based imagers. Disclosed here is a pixel architecture for indirect or phase detection ToF imaging. The pixels designs allow for a low transistor count enabling small pixel pitches for large imagers, such as those used for 3D imaging.

The pixels may have a time gate to produce higher signal to noise ratio (SNR) and lower power consumption. Variations of the structures allow for positive or negative going input SPAD pulses.

The time measurement or counting circuit operates by discharging a known capacitance over a known time. The circuit may be activated by a positive going voltage spike, as produced by the photon-induced avalanche of a positive drive (PD) P-well SPAD. PD deep N-well SPADs or negative drive (ND) P-well SPADs produce a negative going voltage spike on diode avalanche and, if these are used, an inverter should be provided to obtain a positive spike.

Figure 1:
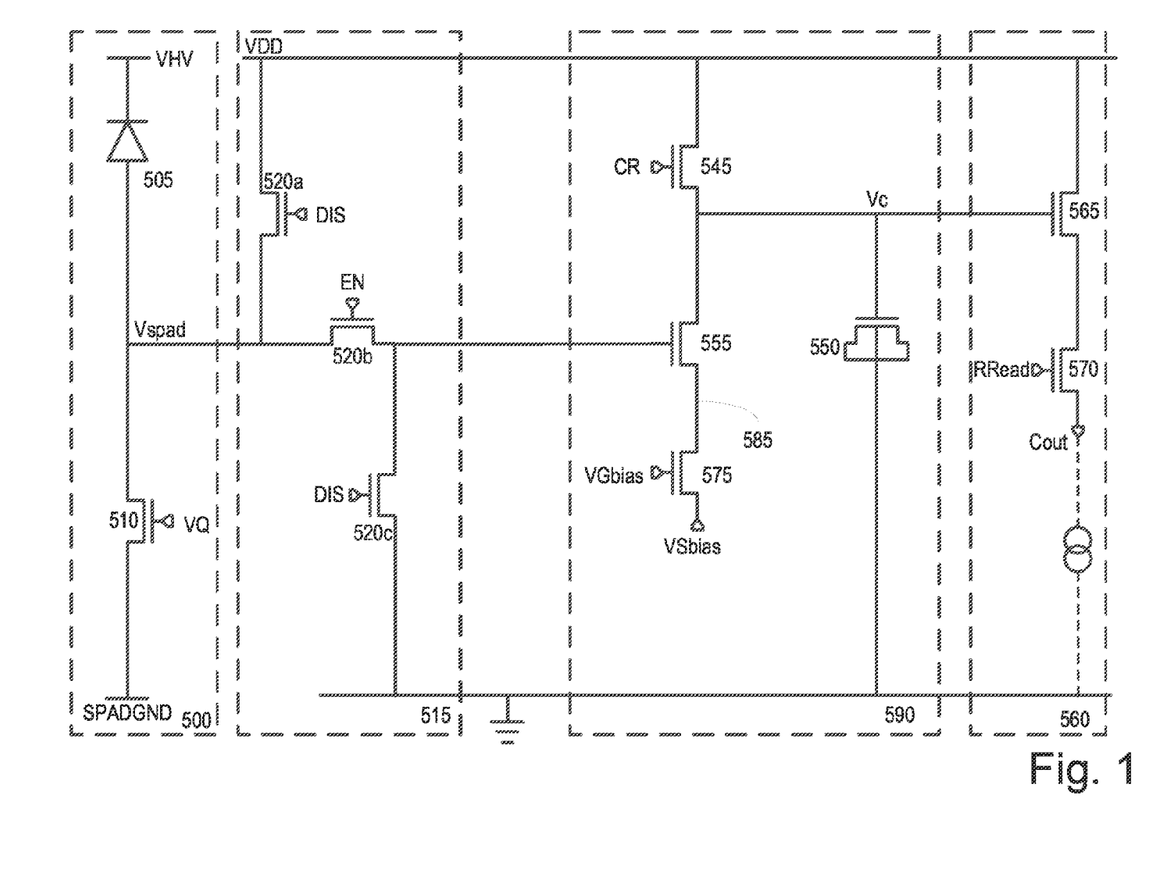
FIG. 1 is a circuit diagram of a time of flight pixel circuit according to a first embodiment.

FIG. 1 shows a Time of Flight pixel circuit according to a first embodiment. This circuit operates as an analog single photon counter. The circuit comprises four main stages.

The first stage is the sensing stage 500, which comprises a SPAD 505 and quenching/reset device 510. The quenching/reset device receives a SPAD reset signal VQ which, when pulsed high or biased above ground potential, causes the avalanche to be quenched.

The second stage is a time gate stage 515. This comprises three MOS devices 520a, 520b, 520c arranged in series between the positive rail and ground. The signal Vspad from the sensing stage 500 output is received at the node between devices 520a and 520b, the time gate stage producing an output at the node between devices 520b and 520c. Devices 520a and 520c receive on their gate a disable signal DIS to selectively disable the pixel. Device 520b receives on its gate an enable signal EN to begin pixel operation. The enable signal EN should be received simultaneously with the activation of a light source, thereby time gating the pixel.

The third stage is a counter stage 590. This comprises MOS devices 545, 555, 575 and capacitor 550. Device 545 receives signal CR at its gate, which selectively controls charging of capacitor 550. Device 555 receives the sensing stage output signal Vspad on its gate (when enable EN is set), causing some of the charge held on capacitor 550 to be discharged by device 575. Device 575 receives a bias signal VGbias on its gate and a bias signal VSbias on its source.

The final stage is a readout stage 560, comprising source-follower device 565 and read device 570. Read device 570 receives an input (row) read signal RRead when pixel readout is required and provides the pixel output as column out signal Cout. The operation of such readout stages are well known and will not be described further here.

Figure 2:
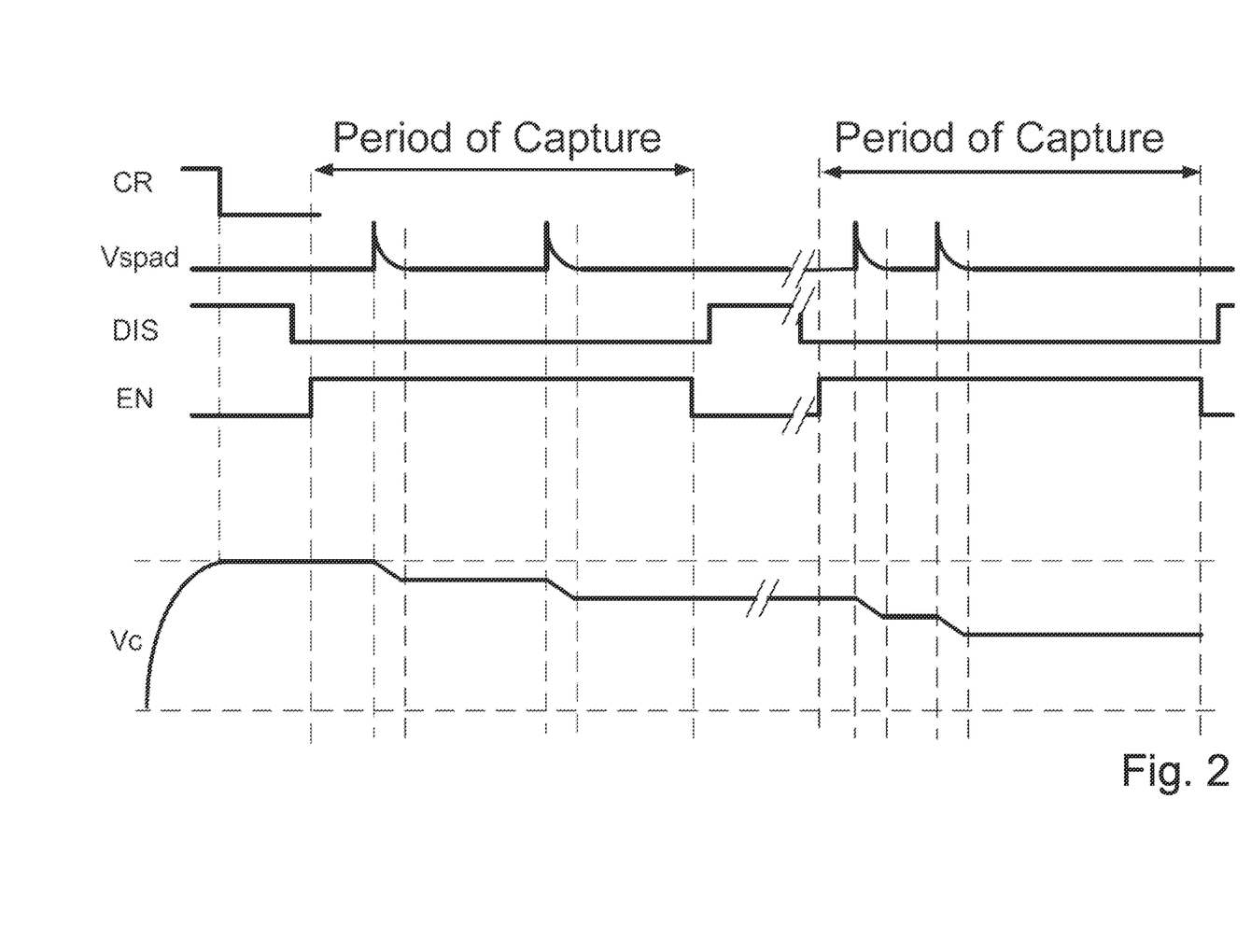
FIG. 2 is a timing diagram illustrating operation of the circuit of FIG. 1 according to an operational embodiment.
Figure 5:
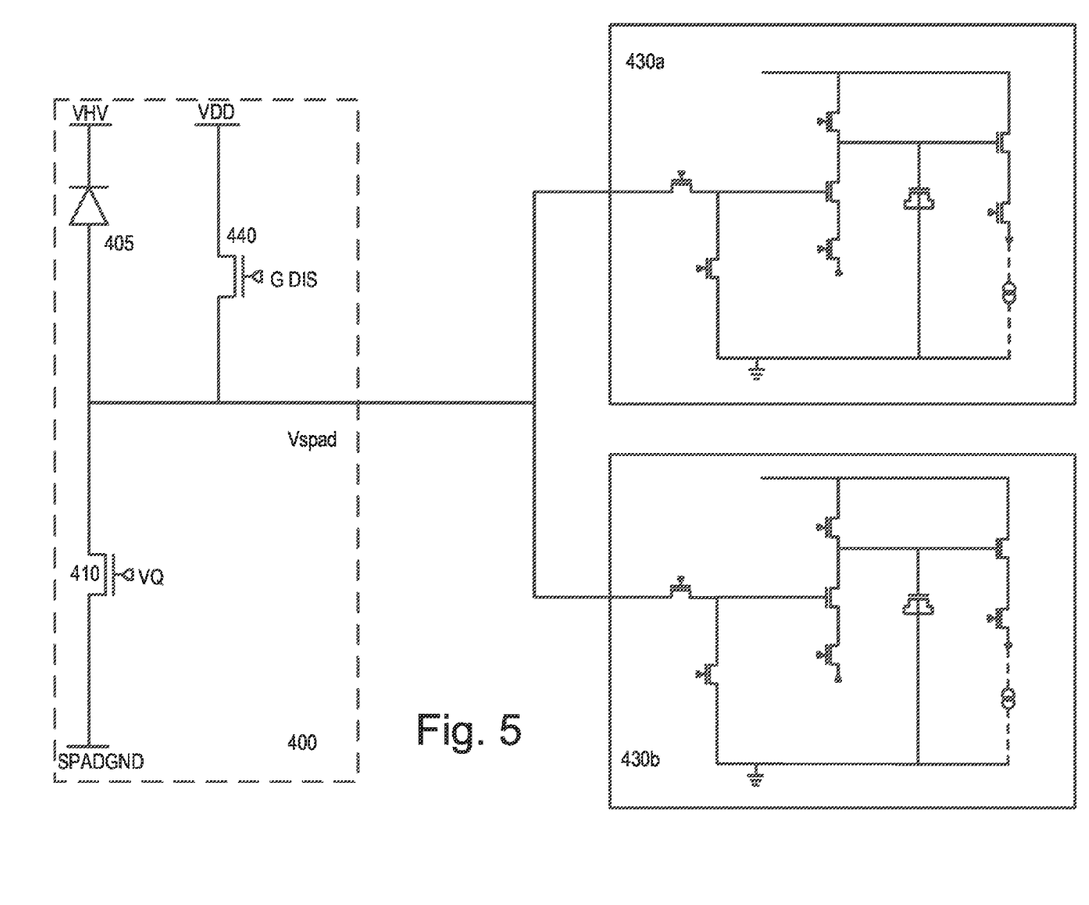
FIG. 5 is a circuit diagram of a time of flight pixel circuit according to a second embodiment.

FIG. 2 is a timing diagram illustrating operation of the circuit of FIG. 5 according to an operational embodiment. It shows the signals: counter reset signal CR, sensing stage output Vspad, disable signal DIS, enable signal EN and pixel output signal Vc across the capacitor 550.

With the SPAD having been reset, the signal CR is pulsed. As a result, capacitor 550 is charged, causing signal Vc to increase until the capacitor 550 is fully charged. Disable signal DIS is set low, closely followed by enable signal EN being set high in synchronization with a pulsed laser or modulated LED. On detecting a photon from the laser or LED, the SPAD signal Vspad will spike high, before being quickly quenched. In this example the quenching is actively controlled by signal VQ. During the time in which signal Vspad is high (above zero), device 555 is switched on, allowing it to discharge capacitor 550 provided that device 575 has discharged the source/drain capacitance at node 585 in the preceding time period. The voltage step seen on signal Vc depends on the unit of charge set by the capacitance at node 585, and signals VGbias and VSbias. Subsequent photons cause further voltage steps on signal Vc, such that the number of photons during a capture period may be determined by the final level of signal Vc.

The pixel circuit can be time gated by modulating the voltage at VSbias. This is an alternative time gating method to using the optional time gate stage 515. If the voltage at node 585 is in a high state because VSbias is high, device 555 will be have a negative or zero gate-source voltage and so will be in an off state, and capacitor 550 will not be discharged. If VSbias is low, and before the SPAD has pulsed, the voltage at node 585 is 0V. When the SPAD pulses, device 555 will have a positive gate-source voltage and the capacitor will be discharged.

The advantage of this time gating method is that it removes the need for a time-gate stage and therefore requires three less transistors. However, the time gate stage 515 isolates the SPAD from the measurement circuit when disabled. When time-gate 515 is not present and signal VQ on device 550 is biased above ground, the SPAD pulsing can undesirably charge pump the capacitor, causing the voltage Vc to rise over time. This can create an error in the time of flight measurement.

The source of MOSFET 575 may simply be tied to ground, but having the VSbias and VGbias inputs enables exact control over the circuit operation: the type of discharge (whether the capacitor has a small voltage step for each pulse or ramps down over the pulse), the rate of discharge of the capacitor and the gate-source voltage of device 555.

The embodiment shown above uses a positive drive (PD) P-well SPAD. PD deep N-well SPADs (such as described in patent application PCT/GB2011/051686) or negative drive (ND) P-well SPADs produce a negative going voltage spike on diode avalanche. Both such SPAD designs (and others) can be used with the concepts disclosed herein.

Figure 3:
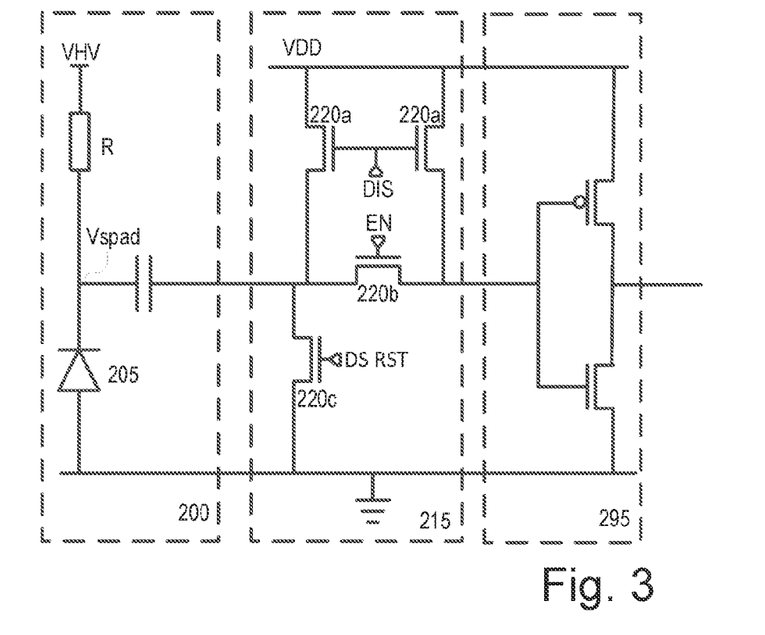
FIG. 3 is a circuit diagram of a first alternative front end for the circuit of FIG. 1.

FIG. 3 shows a variation on the pixel circuit front end for a deep N-well SPAD. The Deep SPAD Structure uses the substrate as one half of its main p-n junction. Because of this, the anode terminal has to be common to the rest of the chip (usually ground). Therefore, the only method of connecting a bias voltage to the SPAD is to the cathode terminal, which requires a positive polarity in order to reverse bias the diode. The breakdown voltage of such a SPAD constructed from deep n-well (DNW) and the substrate will usually be relatively high because of the low doping concentrations involved. The high positive breakdown voltage of the proposed device is not compatible with standard CMOS transistor gates. Therefore, the only method of creating a high voltage compatible 'quench' resistor in CMOS is to use a highly resistive polysilicon to connect the cathode of the SPAD to a positive breakdown voltage supply. Moreover, the SPAD cathode, which is the moving node that falls in response to the avalanche current, cannot be directly connected to the CMOS inverter gates because it is also at a high DC bias level. Therefore, it is required to AC-couple the SPAD moving node to subsequent digital CMOS logic to ensure DC compatibility. To do this, sensing circuit 200 comprises polysilicon resistor R and coupling capacitor C.

As a consequence of this, the time gate stage 215 is modified to reset the sensing circuit. The Disable signal DIS is now received by a pair of devices 220a. A reset signal DS RST is received by device 220c. Furthermore, because the SPAD 205 produces a negative spike, an inverter (in the example shown here, a push-pull inverter 295) is provided.

Figure 4:
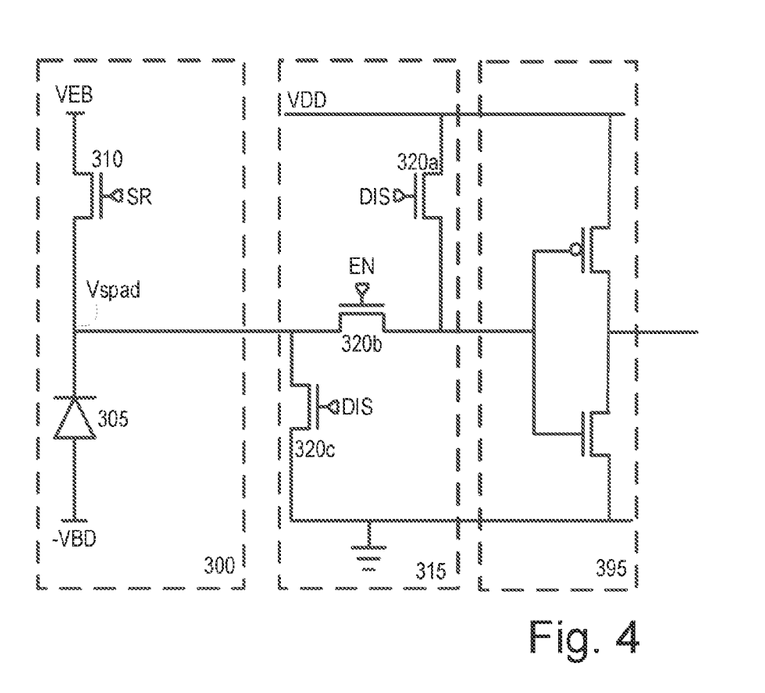
FIG. 4 is a circuit diagram of a second alternative front end for the circuit of FIG. 1.

FIG. 4 shows a variation on the pixel circuit front end for a negative drive (ND) P-well SPAD. The sensing circuit 300 essentially mirrors that of the positive drive (PD) N-well SPAD, but connected with opposite polarity. The time gate stage 315 is essentially similar to the time gate stage 515 already described in relation to FIG. 1. Again, a push-pull inverter 395 is provided to invert the SPAD 305 output. Both front end circuits of FIGS. 3 and 4 can be used in place of sensing circuit 500 and time gate circuit 515 of the embodiments disclosed.

The pixel circuits disclosed herein can be used for various ranging applications, for example. The term "ranging" is intended to cover all ranging devices and methods including by not limited to ranging devices, proximity devices, accelerometers etc. Ranging can occur in a number of applications, including proximity detection which is relative easy to implement and inexpensive; Laser ranging which is more complex and costly than a proximity detector; and three-dimensional imaging which is a high-end application that could be used to recognize gestures and facial expressions.

A proximity sensor is the most basic of the ranging applications. At its simplest the sensor is capable of indicating the presence or absence of a user or object. Additional computation and illuminator complexity can provide enhanced data such as the range to an object. A typical range is of the order 0.01 m to 0.5 m. In a simple proximity sensor the illumination source could be a modulated LED, at a wavelength of about 850 nm.

The next application group is that of laser ranging, where the illumination source is a modulated laser diode. Performance can range from <1 cm to 20 m range (and higher for top end systems) with millimetric accuracy. Requirements on optics are enhanced, with hemispherical lenses and narrow bandpass filters being required. A near-field return may result in the introduction of parallax error, i.e. movement of the returned laser spot over the sensor pixel array dependent on distance to object. To overcome these problems the ranger includes calibration functions to enable the subtraction of the electronic and optical delay through the host system. The illumination source wavelength should be visible so that the user can see what is being targeted and is typically around 635 nm.

The third application group is that of 3D cameras. In this application a pixel array is used in order to avoid mechanical scanning of the array. Systems can be based on a number of different architectures. Both time of flight (TOF) and modulated illuminator based architectures can be used, however, the latter is more robust to ambient light and thus fits best with established photodiode construction. Additional features such as face and gesture recognition are applications of this type of ranging device.

An analog photon counter circuit such as that described herein may be particularly useful in indirect time of flight imaging using statistical binning phase extraction methods. Phase extraction methods basically involve modulating an illumination source (such as by using a square wave, although other modulation shapes can be used), and counting the number of photons received in each of two "bins". Each bin can be visualized as being formed by one half of the same square waveform. The "bin A" corresponds to the time the illumination source is on and "bin B" corresponds to the time that the illumination source is off. Because there is a delay between transmission and reception of the light (corresponding to the photon time of flight), there will be a phase difference between the sent and received waveforms. This phase difference can be determined from the ratio of the photon count of bin A to the photon count of bin B. From this the time of flight can be calculated.

The photon counter circuit described above is a 1 bin design, where each capture period may define a bin. This count should be measured and the process repeated for the second bin to obtain range. However, two bin variants are also possible.

FIG. 5 shows such a two bin variant. Shown is a global input circuit 400, and two analogue single photon counter circuits 430a, 430b; one for each bin. It should be immediately apparent that any number of bins may be provided by having more than 2 analogue single photon counter circuits 430a, 430b connected to the global input circuit 400 output. Global input circuit 400 comprises the sensing circuit of FIG. 1 (SPAD 405 and switch 410) and a global disable device 440, which forms part of the time gating mechanism, and is operable to disable all bins globally in dependence of a global disable signal G DIS on its gate.

Figure 6:
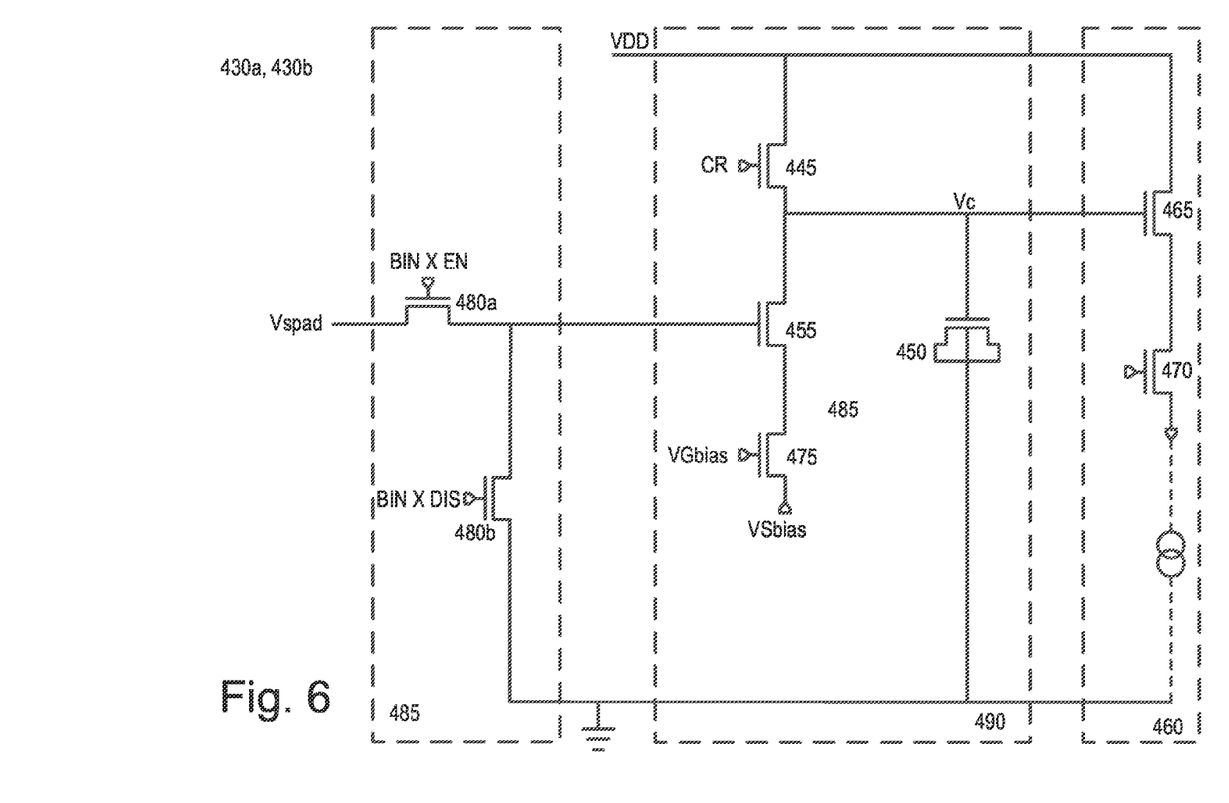
FIG. 6 is a detail of one of the counting circuits of the time of flight pixel circuit of FIG. 5.

FIG. 6 shows a detail of one of the analogue single photon counter circuits 430a, 430b. Counter stage 490 is the same as counter stage 590 and readout stage 460 is the same as readout stage 560. The time gate stage 485 comprises a switch 480a controlled by bin enable signal BIN X EN and switch 480b controlled by bin disable signal BIN X DIS. The X signifies that each bin receives dedicated enable and disable control signals.

The time gate is split into two paths. The enable signal for bin A, BIN A EN is the reciprocal or inversion of the enable signal for bin B, BIN B EN. That is, when bin A is enabled, bin B is disabled and vice versa. The combination of the global disable device 440 and the time gate stage 485 of each analog single photon counter circuit 430a, 430b replicates the time gate operation of time gate 515 of FIG. 1, but for each bin separately. With suitable control, the circuit will reciprocate between counting in bin A (using 430a) and counting in bin B (using circuit 430b).

The pixel pitches of these analog circuits are may be less than 20 μm, and may even be less than 10 μm. In fact, versions with a pixel pitch of 9.6 μm have been designed. This compares favorably with previous digital designs and existing photodiode based approaches.

Variations have been designed to allow for differing functionality, physical pixel pitches and SPAD type. Some variations are detailed herein, but further variations (e.g. different types of inverter etc) have not been specifically described but fall within the spirit and scope of the invention.

What is claimed is:

1. A pixel circuit, comprising:
   a single photon avalanche diode (SPAD) configured to detect SPAD events;
   a measurement circuit comprising a capacitance,
   wherein said measurement circuit is operable to discharge a portion of the charge on said capacitance upon each SPAD event detection within a time period, such that the charge remaining on said capacitance at the end of the time period corresponds to the number of SPAD events detected within the time period; and
   a time gating stage operable to begin sensing operation on reception of an enable signal and comprising:
   a switch operable to selectively connect the SPAD output to the measurement circuit on reception of said enable signal; and
   two further switches operable to disable the pixel circuit on reception of a disable signal.

2. The pixel circuit as claimed in claim 1, wherein the charge remaining on said capacitance is an analog representation of the number of SPAD events detected within the time period.

3. The pixel circuit as claimed in claim 1, further comprising a switch controlled by the SPAD output such that it causes said discharge of a known portion of the charge on said capacitance on each detection of a SPAD event.

4. The pixel circuit as claimed in claim 1, further comprising a plurality of measurement circuits, each having a capacitance, wherein each measurement circuit defines a statistical bin.

5. The pixel circuit as claimed in claim 4, operable such that:
   said time period is divided between the statistical bins, such that periodically repeating portions of said time period are exclusively assigned to one of said statistical bins; and
   wherein each of said measurement circuits is operable to discharge a known portion of the charge on its respective capacitance upon each detection of a SPAD event only during the portion of said time period exclusively assigned to that measurement circuit.

6. The pixel circuit as claimed in claim 4, wherein the photon originates with a modulated radiation source, the circuit operable to:
   define a first statistical bin to coincide with the portion of said time period during which said modulated radiation source is on
   define a second statistical bin to coincide with the portion of said time period during which said modulated radiation source is off;
   count the number of SPAD events received in each of said first and second statistical bins, calculate a phase change in radiation incident on said SPAD compared to radiation having been emitted by said modulated radiation source, from the ratio of the number of SPAD events received in one of said first and second statistical bins to the number of SPAD events received in the other of said first and second statistical bins, and calculate from said phase change, the time of flight of radiation emitted by said radiation source and incident on said SPAD.

7. A time resolved imaging apparatus, comprising:
an array of pixel circuits, each pixel circuit comprising:
  a single photon avalanche diode (SPAD) configured to detect SPAD events;
  a measurement circuit comprising a capacitance,
  wherein said measurement circuit is operable to discharge a portion of the charge on said capacitance upon each SPAD event detection within a time period, such that the charge remaining on said capacitance at the end of the time period corresponds to the number of SPAD events detected within the time period, and
  a radiation source for providing radiation incident on said SPAD;
wherein the time resolved imaging apparatus is operable to modulate said radiation source and to switch between counting using a first statistical bin and counting using a second statistical bin, said switching being in phase with the modulation of said radiation source.

8. The time resolved imaging apparatus as claimed in claim 7, being operable to begin sensing operation of said array of pixels simultaneously with activation of said radiation source.

9. The time resolved imaging apparatus as claimed in claim 7, being operable to perform three-dimensional imaging.

10. A method of measuring the time of flight of a photon, comprising:
  activating a radiation source to emit photons;
  detecting photons using a single photon avalanche diode (SPAD);
  discharging a known portion of the charge on a capacitance upon each detection of a photon within a time period, such that the charge remaining on said capacitance at the end of the time period corresponds to the number of photons detected within the time period; and
  dividing said time period between a plurality of statistical bins, such that periodically repeating portions of said time period are exclusively assigned to one of said statistical bins.

11. The method as claimed in claim 10, wherein the charge remaining on said capacitance is an analog representation of the number of SPAD events detected within the time period.

12. The method as claimed in claim 10, wherein said radiation source is modulated, and comprising:
  defining a first statistical bin to coincide with the portion of said time period during which said modulated radiation source is on;
  defining a second statistical bin to coincide with the portion of said time period during which said modulated radiation source is off;
  counting the number of SPAD events received in each of said first and second statistical bins,
  calculating a phase change in the radiation received by said SPAD compared to radiation emitted by said radiation source, from the ratio of the number of SPAD events received in one of said first and second statistical bins to the number of SPAD events received in the other of said first and second statistical bins, and
  calculating from said phase change, the time of flight of radiation received by said SPAD.

13. A pixel circuit, comprising:
a single photon avalanche diode (SPAD) configured to detect SPAD events;
a measurement circuit comprising a capacitance,
wherein said measurement circuit is operable to discharge a portion of the charge on said capacitance upon each SPAD event detection within a time period, such that the charge remaining on said capacitance at the end of the time period corresponds to the number of SPAD events detected within the time period;
a plurality of measurement circuits, each having a capacitance, wherein each measurement circuit defines a statistical bin; and
wherein the pixel circuit is operable such that:
  said time period is divided between the statistical bins, such that periodically repeating portions of said time period are exclusively assigned to one of said statistical bins; and
  wherein each of said measurement circuits is operable to discharge a known portion of the charge on its respective capacitance upon each detection of a SPAD event only during the portion of said time period exclusively assigned to that measurement circuit.

14. The pixel circuit as claimed in claim 13, further comprising a time gating stage operable to begin sensing operation on reception of an enable signal.

15. The pixel circuit as claimed in claim 14, wherein said time gating stage comprises a switch operable to selectively connect the SPAD output to the measurement circuit on reception of said enable signal.

16. The pixel circuit as claimed in claim 15, wherein said time gating stage comprises two further switches operable to disable the pixel circuit on reception of a disable signal.

17. The pixel circuit as claimed in claim 13, wherein the charge remaining on said capacitance is an analog representation of the number of SPAD events detected within the time period.

18. The pixel circuit as claimed in claim 13 further comprising a switch controlled by the SPAD output such that it causes said discharge of a known portion of the charge on said capacitance on each detection of a SPAD event.

19. A pixel circuit, comprising:
a single photon avalanche diode (SPAD) configured to detect SPAD events;
a measurement circuit comprising a capacitance,
wherein said measurement circuit is operable to discharge a portion of the charge on said capacitance upon each SPAD event detection within a time period, such that the charge remaining on said capacitance at the end of the time period corresponds to the number of SPAD events detected within the time period;
comprising a plurality of measurement circuits, each having a capacitance, wherein each measurement circuit defines a statistical bin;
wherein the photon originates with a modulated radiation source;
wherein the pixel circuit is operable to:
  define a first statistical bin to coincide with the portion of said time period during which said modulated radiation source is on;
  define a second statistical bin to coincide with the portion of said time period during which said modulated radiation source is off;
  count the number of SPAD events received in each of said first and second statistical bins, calculate a phase change in radiation incident on said SPAD compared to radiation having been emitted by said modulated radiation source, from the ratio of the number of SPAD events received in one of said first and second statistical bins to the number of SPAD events received in the other of said first and second statistical bins, and calculate from said phase change, the time of flight of radiation emitted by said radiation source and incident on said SPAD.

20. The pixel circuit as claimed in claim 19, further comprising a time gating stage operable to begin sensing operation on reception of an enable signal.

21. The pixel circuit as claimed in claim 20, wherein said time gating stage comprises a switch operable to selectively connect the SPAD output to the measurement circuit on reception of said enable signal.

22. The pixel circuit as claimed in claim 21, wherein said time gating stage comprises two further switches operable to disable the pixel circuit on reception of a disable signal.

23. The pixel circuit as claimed in claim 19, wherein the charge remaining on said capacitance is an analog representation of the number of SPAD events detected within the time period.

24. The pixel circuit as claimed in claim 19, further comprising a switch controlled by the SPAD output such that it causes said discharge of a known portion of the charge on said capacitance on each detection of a SPAD event.

* * * * *